Dec. 4, 1934.     N. H. KNOWLTON     1,982,744
ASSEMBLING MACHINE
Filed Dec. 31, 1932     4 Sheets-Sheet 1

INVENTOR
Norwood H. Knowlton
By his Attorney
Harlow M. Davis

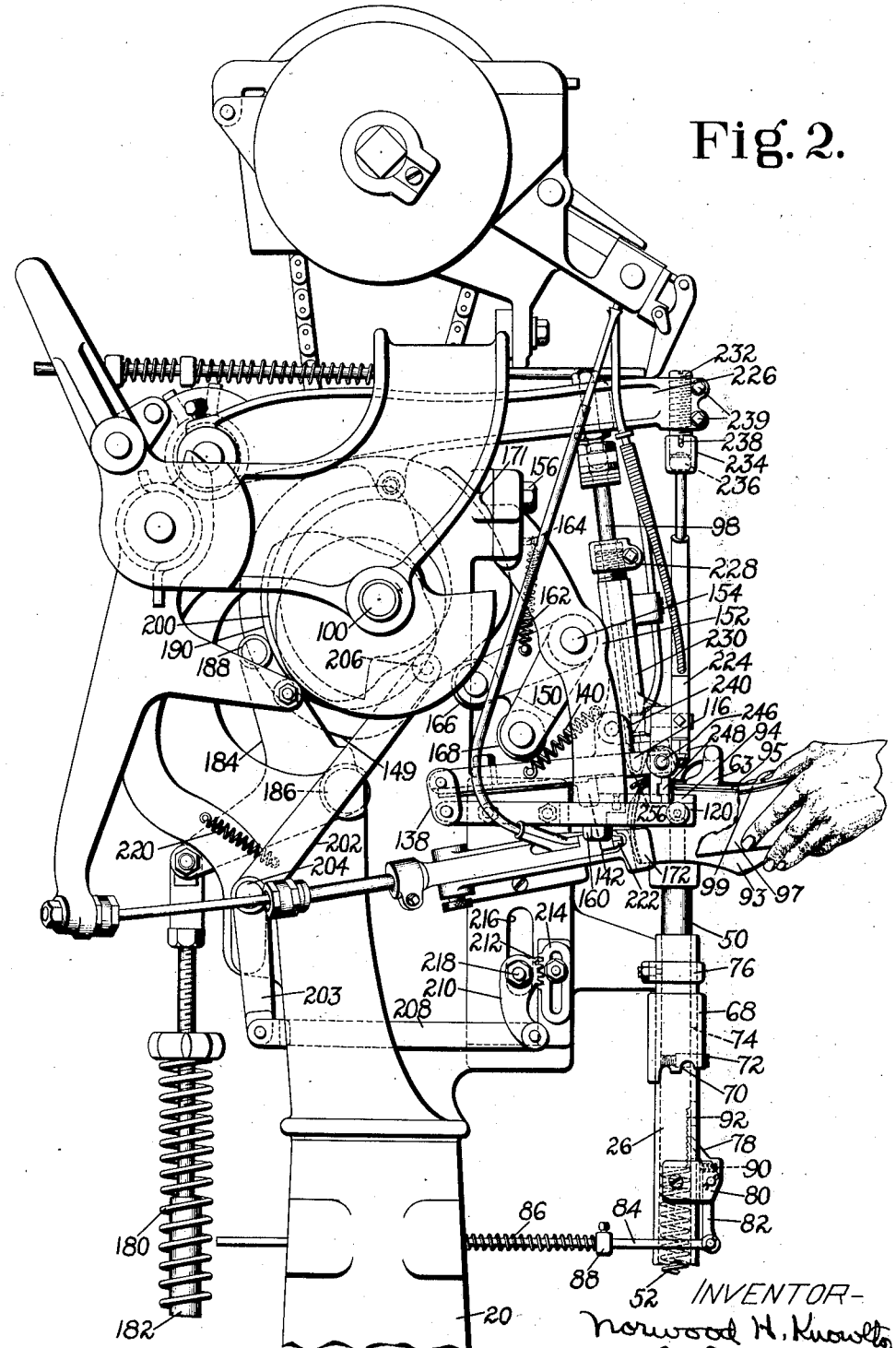

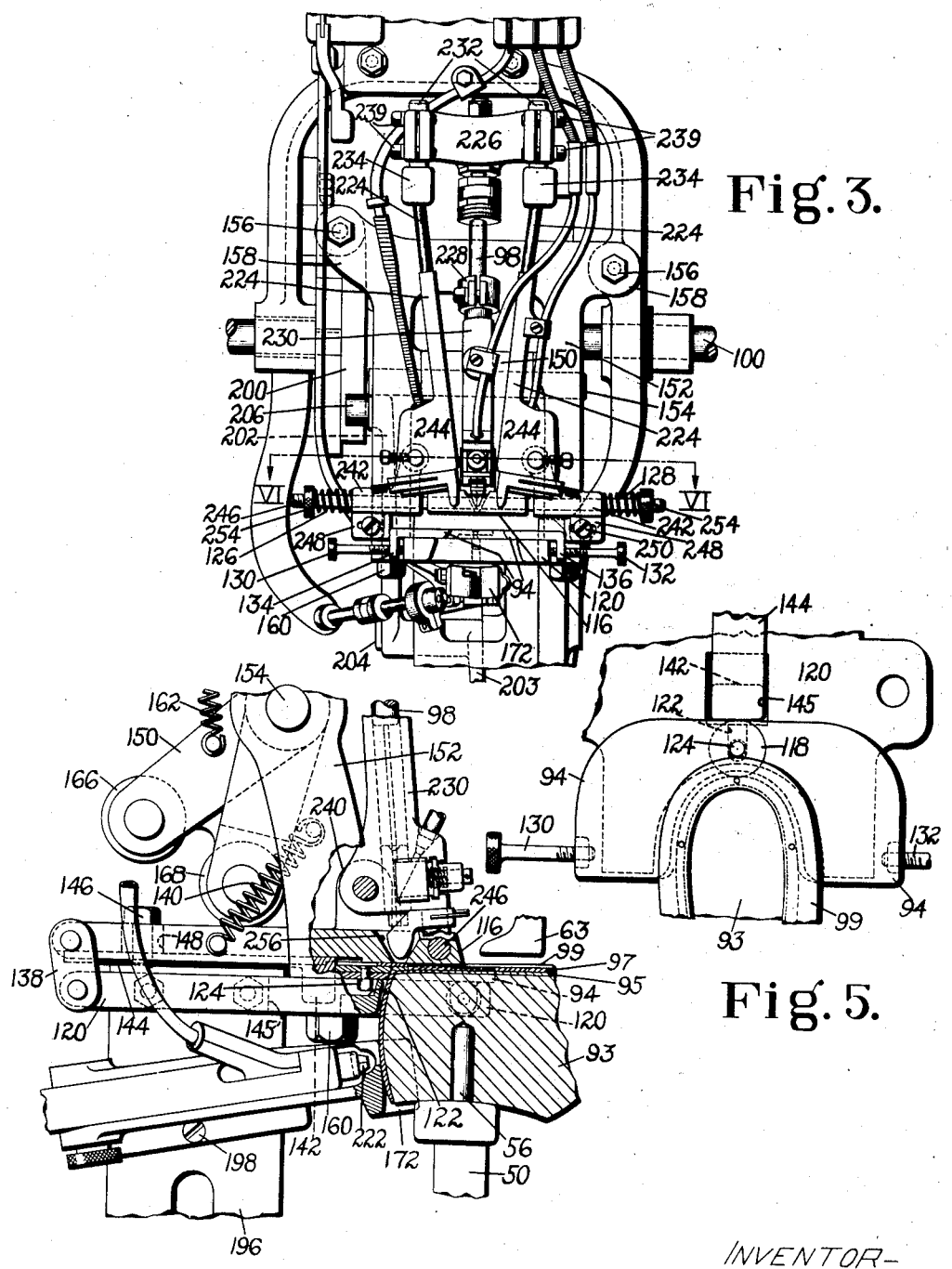

Dec. 4, 1934.  N. H. KNOWLTON  1,982,744
ASSEMBLING MACHINE
Filed Dec. 31, 1932      4 Sheets-Sheet 4
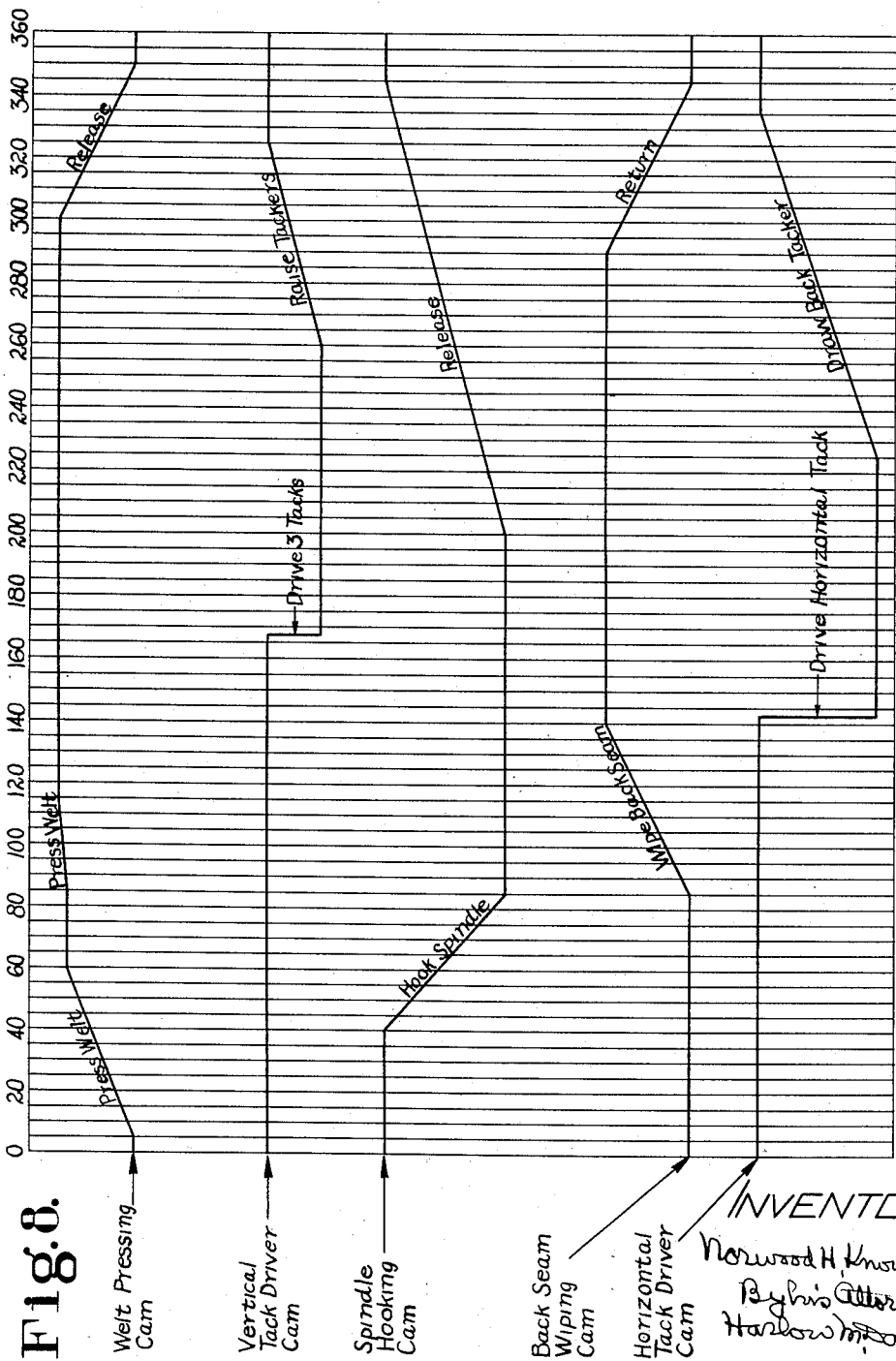

Patented Dec. 4, 1934

1,982,744

UNITED STATES PATENT OFFICE 1,982,744

ASSEMBLING MACHINE

Norwood H. Knowlton, Rockport, Mass., assignor to United Shoe Machinery Corporation, Paterson, N. J., a corporation of New Jersey Application December 31, 1932, Serial No. 649,680

53 Claims. (Cl. 12—4)

This invention relates to improvements in machines for use in the manufacture of shoes and is illustrated herein as embodied in a machine for assembling pre-welted shoes, that is, shoes in the manufacture of which the welt is attached to the upper before the upper is lasted. For the purpose of illustration the invention is herein shown as embodied in a machine of the type disclosed in United States Letters Patent No. 1,356,510 granted Oct. 26, 1920, on application of Hannah Ashton, executrix of the will of Orrell Ashton; in United States Letters Patent No. 1,443,288, granted Jan. 23, 1923, on application of William Stewart; and in United States Letters Patent No. 1,602,618, granted Oct. 12, 1926 on my application.

It is to be understood, however, that the invention is not restricted to embodiment in a machine of this particular type, certain features of the invention being of more general application to machines for operating upon boots and shoes.

An object of the invention is to provide a machine for assembling pre-welted uppers upon their lasts which is completely automatic in its action. More particularly, an object of the invention is to provide a machine adapted for assembling pre-welted uppers upon their lasts without sacrifice of the utility of such machines as previously organized. The invention, in its most important aspects, is particularly suited to operate upon pre-welted uppers in which the welt is extended about the heel end of the upper.

In assembling a pre-welted upper upon its last by the use of the illustrated machine the last is mounted upon a last support and a pre-welted upper is arranged thereon, the welt having first been tempered to make it pliable. The last and upper are then presented to the machine which acts first to straighten the welt, that is, to bring the welt into a plane parallel to the last bottom, and to arrange the upper accurately heightwise of the heel end of the last, then to press the welt out flat, downwipe the back seam in order to eliminate wrinkles therefrom, and finally to insert temporary fastenings to hold the upper in assembled position upon the last.

In accordance with a feature of the invention, there is provided a support for the welt comprising wipers supported at a fixed elevation and arranged to engage within the welt crease, a welt presser arranged in opposition to said wipers, and means for actuating the presser to press the welt flat about one end of the upper. In order that the wipers may enter the welt crease throughout the extent of its heel seat portion and operate to overwipe the heel end of the upper there is provided in accordance with a feature of the invention an organization including means for actuating the welt presser to bring the welt into parallel relation to the heel seat, and means for effecting relative movement of the last and the wipers in order to bring the wipers into engagement within the welt crease and to overwipe the heel end portion of the upper margin. In the illustrated machine the welt is supported upon wipers which are constructed and arranged to engage within the welt crease, that is, the angle formed between the welt and the upper. The wipers are preferably so arranged that they are in substantially parallel relation to the heel seat when the last and upper are in position to be operated upon, and in accordance with a feature of the invention, the wipers operate to determine the arrangement of the heel end of the upper, and particularly, the arrangement of the welt, relatively to the plane of the heel seat.

In accordance with another feature of the invention the last is mounted upon a last support which is yieldingly supported by a post or spindle, the spindle in turn being yieldingly supported upon an arm arranged to swing toward and from the machine column. In conjunction with the last support there is provided a depressor constructed and arranged to depress the last bottom in order to bring it into an elevation relatively to the operating instrumentalities such that the welt may be positioned between the welt presser and the welt supporting wipers. The depressor may be the same as that disclosed in my Patent No. 1,602,618, above referred to. The depressor operates during the movement of the spindle toward the machine to depress the last support relatively to the spindle until a locking means, which constitutes a feature of the invention, operates to lock the last support to the spindle. As illustrated, the locking means consists of a latch arranged to be actuated by movement imparted to the spindle, for example its movement toward the machine. After the last support has been locked to the spindle, the last and upper may be further depressed to bring the welt into engagement with the wipers, this further depression being permitted by the yielding support between the spindle and its carrier which, however, offers sufficient resistance to the depression of the last to afford an adequate support for the last and upper during the tacking operation.

In order to rub out any wrinkles that may have occurred at the heel end of the upper there is provided a wiper for downwiping the back seam. As illustrated, the wiper is substantially the same as that disclosed in Patent No. 1,443,288, above referred to. There is also provided power actuated means for further actuating the spindle, after the operator has swung it toward the machine into operative position, in order to urge the last and upper rearwardly against the back seam wiper, said wiper, in the machine herein illustrated, operating as an abutment to arrest such rearward movement of the last and upper. The power actuated means for further moving the spindle toward the machine may be substantially the same as the hook disclosed in Patent No. 1,602,618 above referred to.

In accordance with a feature of the invention there is provided means for clamping the welt and holding it against downward movement during the actuation of the back seam wiper to downwipe the heel end of the upper. Said clamping means may consist of the welt presser and its opposing wipers, above referred to. Since the downwiping of the heel end of the upper is accompanied by a rearward movement of the last and upper it is desirable that the clamp which holds the welt against downward movement be afforded a sufficient lengthwise movement to permit it to travel rearwardly with the last and upper and, accordingly, a further feature of the invention comprises a clamp for clamping the welt and holding it against downward movement, said clamp being arranged to permit a movement of the last and upper toward the wiper after the welt has been clamped.

Another feature of the invention consists in an organization including means, for example, tack drivers, for inserting fastenings through the welt and upper and into the last bottom at opposite sides of the heel seat, wipers for engaging the upper and welt at the welt crease, which may be the same as the wipers which cooperate with the welt presser to clamp the welt, and means actuated by the wipers for determining the arrangement of said fastenings widthwise of the heel seat. As illustrated, the wipers are yieldingly brought toward each other to predetermined limits and are spread apart by the engagement of the heel end of a last and upper therebetween.

It is desirable that the tackers partake of the movement of the wipers lengthwise of the last, and accordingly, a feature of the invention consists in an organization wherein the tackers are arranged for movement lengthwise of the last with the wipers. There is also provided, in accordance with a further feature of the invention, means for varying the relative position of the tackers and the wipers lengthwise of the last in order that the central heel seat tack may be inserted as close to the seam uniting the welt and upper as may be desired without danger of driving the tack through the seam itself.

It is desirable that the tacks whereby the welt and upper are attached to the shoe bottom be left upstanding above the surface of the welt in order to facilitate their removal. Accordingly a feature of the invention consists of an organization comprising a plurality of wipers for overwiping the heel end of a pre-welted upper, a plurality of tackers for driving tacks through the welt and upper at opposite sides of the heel end of the upper, a central heel seat tacker for driving a tack through the welt and upper, an actuator for said tackers, and an adjustable abutment for arresting the actuator.

It has been learned that a variation in the position of the tackers lengthwise of the last varies the extent to which the central heel seat tack is left upstanding above the work relatively to the side tacks. In some cases, the central heel seat tack is left upstanding while the side tacks are driven completely into the work unless provision is made for a relative adjustment of the strokes of the drivers. Accordingly, there is provided, in accordance with a further feature of the invention, an organization including means for relative adjustment of the strokes of the drivers whereby any variations in the extent to which said tacks remain upstanding above the surface of the welt may conveniently be changed.

It is desirable that the tacker nozzles be sufficiently remote from the work after the tacking operation to ensure that the work, with the upstanding tacks inserted therein, can be withdrawn from the machine without interference from the tacker nozzles. Accordingly, another feature of the invention consists in an organization including a welt presser arranged for movement heightwise of the last and connections between the welt presser and the tackers whereby the heightwise movement of the welt presser is imparted to the tackers.

These and other features of the invention including various novel constructions and combinations of parts will appear more fully from the following detailed description when read in connection with the accompanying drawings and will be pointed out in the appended claims.

In the drawings,

Fig. 2 is a side elevation of the head of the machine with a last and upper in position to be operated upon;

Fig. 3 is a fragmentary front elevation illustrating certain parts in the head of the machine;

Fig. 4 is a fragmentary side elevation partly in section illustrating particularly the welt clamping means in its operative position and the back seam wiper at the limit of its stroke;

Fig. 5 is a fragmentary plan view illustrating the heel end of a last and upper together with the welt supporting wiper plates;

Fig. 8 is a chart of the cam motions of the illustrated machine.

Figures 1, 6, 7:
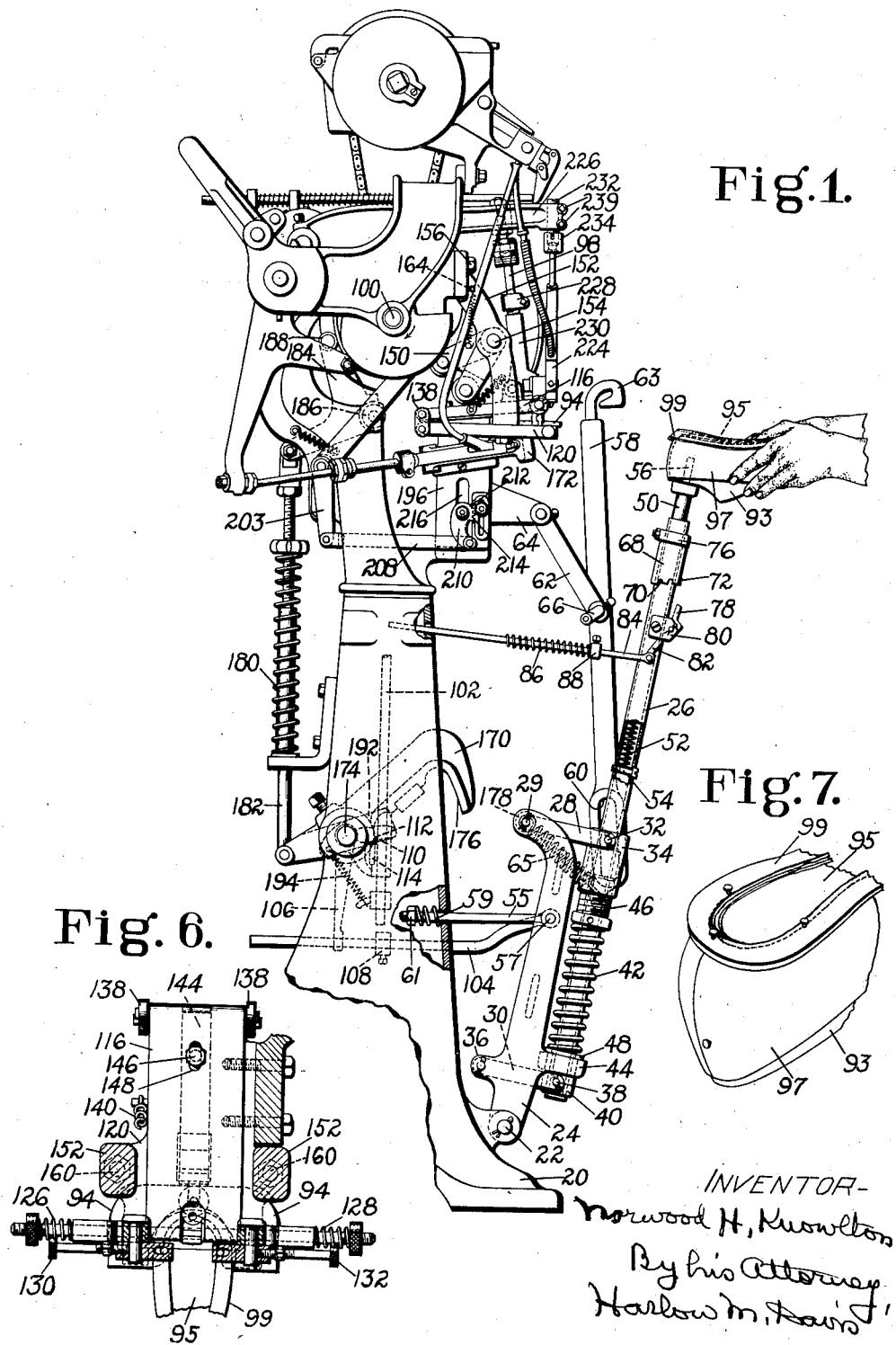
Fig. 1 is a side elevation, partly in section, of a machine embodying the present invention.
Fig. 6 is a horizontal section taken substantially on the line VI—VI of Fig. 3.
Fig. 7 is a broken perspective of a last with a pre-welted upper assembled thereon.

In Fig. 1 of the drawings is shown a side elevation of a machine having, in general, the organization disclosed in the patents above-identified to which reference may be had for a detailed description of parts which are not fully described herein.

The illustrated machine is provided with a base or column 20 to which is pivoted at 22 an arm or carrier 24 upon which is yieldingly supported a hollow work supporting spindle 26. The spindle 26 is maintained parallel to the carrier 24 by parallel motion links 28 and 30 which permit a limited heightwise movement of the spindle. The links 28 are pivoted at their rearward ends, by means of a cross pin 29 to the rearwardly extended upper extremity of the carrier 24 and at their forward ends to a cross pin 32 arranged to extend through the spindle 26 and through a tubular member 34 surrounding the spindle. The links 30 are pivoted to lugs 36 extending rearwardly from the carrier 24 near its lower extremity. At their forward ends the links 30 are pivoted to a cross pin 38 arranged to extend through the spindle 26 and through a collar 40 surrounding the spindle. The spindle 26 is yieldingly supported by a compression spring 42 surrounding the lower portion of the spindle and positioned between a forward extension 44 of the carrier 24 and a threaded capstan sleeve 46 surrounding the spindle and threaded into an internally threaded socket in the tubular member 34. In order to accommodate the transverse component of the heightwise movement of the spindle 26, the forward extension 44 of the carrier is provided with an oversized hole for the reception of the spindle and a washer 48 is preferably provided to form a seat for the spring 42. It will be seen that upward movement of the spindle by the spring 42 is limited by the collar 40 and it will also be seen that the compression of the spring may conveniently be adjusted by the capstan sleeve 46. At its upper end the spindle 26 carries a heel post or last pin 50 (Fig. 2) slidably mounted within the upper extremity of the spindle and yieldingly supported therein upon a compression spring 52 resting upon a screw 54 (Fig. 1) passing through the spindle. The heel post 50 is provided with a last pin 56 arranged to support a last in inverted position. Outward swinging movement of the spindle 26 is limited by a rod 55 pivoted at 57 to the carrier 24 and arranged to extend through an opening in the machine column 20. On the rod inside the column is a spring 59 which is held on the rod by a nut 61 and engages the column yieldingly to limit outward movement of the jack spindle.

In order to depress the last to bring the last bottom into a predetermined elevation as the jack spindle is swung to bring the shoe into position to be operated upon, a depressor 58, (Fig. 1) which may be constructed and arranged as disclosed in Patent No. 1,602,618, above referred to, is arranged to be brought into engagement with the last bottom by the actuation of the jack spindle and to move downwardly relatively to the spindle until it comes to rest at a predetermined elevation. At its lower end the depressor 58 is provided with a slot 60 within which is received one end of the cross pin 32. A spring 65 is connected in an inclined position between the lower end of the depressor and the cross pin 29 in the carrier 24. Since the pull of the spring is in an upwardly and rearwardly inclined direction, one component of the pull tends to lift the depressor and the other to swing the depressor outwardly upon the cross pin 32 as a pivot. The depressor has a predetermined downward movement imparted thereto by the action of a link 62 pivoted at one end thereof, approximately midway of the height of the depressor and at its opposite end to an arm 64 extending forwardly from the machine frame at an elevation such that the link 62 normally extends downwardly and forwardly from its pivotal connection therewith. The swinging movement of the jack spindle 26 is imparted to the depressor 58 by the engagement of the spindle with the horizontal arm of a crank pin 66 forming the pivotal connection of the link 62 with the depressor 58, said crank pin having provision for rotative adjustment in order to vary the stroke of the depressor. The depressed position of the last may be varied by adjusting the position of the presser foot 63 in the depressor bar 58.

In the illustrated machine means is provided for a preliminary heightwise adjustment of the last pin, said means comprising a sleeve 68 (Fig. 2) slidably mounted on the spindle 26 and provided at its lower end with a series of rounded notches 70 arranged progressively about the sleeve, the extremities of said notches being positioned at progressively varying elevations. The heel post 50 is provided with a screw 72 extending outwardly from the heel post into position to engage alternatively within the notches 70 formed in the sleeve 68. The screw 72 is arranged to extend through a slot 74 formed in the spindle 26 and extending heightwise thereof in order to permit a limited heightwise movement of the heel post 50. The sleeve 68 is normally held against a collar 76 secured to the spindle 26 near its upper end.

As the spindle is swung in and the depressor 58 is actuated to bring the last bottom into a predetermined elevation the spring 52 is compressed, the heavier spring 42 remaining substantially unaffected. As the spindle nears the limit of its inward movement a latch member 78 is automatically actuated to engage ratchet teeth 92 formed in the heel post 50 in order to lock the heel post to the spindle, whereby a further depression of the heel post by the welt pressing means hereinafter described is resisted by the relatively heavy spring 42. The latch member 78 is pivoted to a bracket 80 secured to the spindle and is provided with a downward extension 82 to which is pivoted a link 84 arranged to extend through and to be supported by the machine column 20. A compression spring 86 is mounted on the link 84 between a collar 88 and the front of the machine column. When the spindle is in its retracted position, as shown in Fig. 1, the rearward end of the compression spring 86 is spaced away from the front of the machine column sufficiently to permit the spindle to swing inwardly almost to the limit of its movement, before the spring 86 engages the machine column in order to actuate the latch member 78. The heel post 50 is thus permitted to move downwardly relatively to the spindle throughout substantially the full extent of the actuation of the spindle in order to bring the last into the desired elevation. The latch member 78 is normally held in its inoperative position by a compression spring 90 (Fig. 2) seated in a socket formed in the latch member 78 and arranged to press against the spindle 26. An opening is formed in the spindle through which the latch member 78 swings in order to bring it into engagement with ratchet teeth 92 formed in the heel post. The ratchet teeth are maintained in position to be engaged by the latch member 78 by the engagement of the screw 72 within the slot 74 in the spindle, the width of said slot being substantially equal to the diameter of the screw in order to prevent the heel post from turning.

An upper 97 with a welt 99 stitched thereto is loosely arranged upon a last 93, and the last, with the pre-welted upper arranged thereon, is placed on the last pin 56. The operator then arranges the upper to position it substantially as shown in Fig. 1 and, while holding the upper to the last, swings the last with the jack spindle 26 toward the machine, nothing further being required of the operator except to move the spindle.

The depressor 58, by the mutual relative movement between it and the spindle, first assumes a position over the last and is then moved downwardly to depress the last to the proper working position relatively to the operating instrumentalities of the machine.

As the heel end of the last and upper approach the machine they pass between the inner edges of a pair of wiper plates 94. As shown in Fig. 3, the space between the inner edges of said plates is somewhat less than the width of the heel seat of a last and, consequently, as the last and upper approach the machine the upper engages the wiper plates, spreading them apart from each other. Such sidewise movement of the wiper plates imparts a like movement to a pair of tackers 224 arranged to drive tacks through the welt, upper and insole at opposite sides of the heel seat. The engagement of the rear end of the last with the wiper plates 94 also operates to determine the position of a central heel seat tacker 98 lengthwise of the last, the operative position of the wiper plates 94 being adjustable lengthwise of the last in order to vary the adjustment of the central heel seat tacker, as hereinafter described.

The later portion of the swinging movement of the spindle 26 to bring the last into position to be operated upon is utilized to start the power operation of the machine. Between the driving pulley (not shown) and the main shaft 100 of the machine a clutch is provided which may be of the type disclosed in United States Letters Patent No. 1,026,067, granted May 14, 1912 on application of Orrell Ashton. The clutch is operated to cause power to be transmitted to the shaft 100 by a downward pull on the clutch rod 102 (Fig. 1). The mechanism whereby the movement of the jack spindle 26 imparts a downward pull to the clutch rod 102 is substantially the same as that disclosed in United States Letters Patent No. 1,602,618, above referred to. Briefly described this mechanism comprises a rod 104 pivoted at 57 to the carrier 24 and mounted to slide through the lower end of an arm 106 pivoted to the machine column. The rod 104 has a collar 108 secured thereto in position to engage the arm 106 as the jack spindle approaches the limit of its inward movement, thereby swinging an arm 110 and causing a latch member (not shown) carried by said arm to engage a plate 114 secured to the clutch rod 102 thereby imparting the desired downward pull to the clutch rod to trip the clutch.

During the initial stage of the operation of the machine a welt presser 116 (Fig. 2) is actuated to straighten the welt about the heel end of the last in order to arrange it in parallel relation to the heel seat. The straightening of the welt is effected by depressing the last and upper against the resistance of the spring 42 which yieldingly supports the spindle 26, the depression being arrested by the wiper plates 94 which are constructed and arranged to embrace the heel end of the last and upper and have an undercut bevel formed in their upper engaging edges in order to permit them to extend into the angle between the welt and upper, hereinafter referred to as the welt crease. The wiper plates 94 are pivotally connected by a halved joint 118 (Fig. 5) at a point substantially in alinement with the longitudinal center line of the heel seat. The wiper plates are supported upon a table 120 fixedly secured to the machine frame and having a lengthwise groove 122 (Fig. 4) formed near its forward end for the reception of the downwardly extending head of the rivet 124 upon which the wiper plates are pivoted. The wiper plates are thus maintained in position to embrace the heel end of a last and upper as the last and upper are brought into position to be operated upon, while being permitted to move lengthwise of the last within the limits afforded by the groove 122. The wiper plates 94 are urged toward each other by compression springs 126 and 128 (Fig. 3) through connections hereinafter described. The closing movement of the wiper plates by said springs is limited by abutment screws 130 and 132 threaded into ears 134 and 136 respectively depending from the outer edges of the wiper plates near their forward extremities.

The welt presser 116 is pivoted at its rearward end to a pair of links 138 (Figs. 4 and 6) positioned at opposite sides of the rear end of the welt presser. At their lower ends the links 138 are pivoted at opposite sides of the table 120. A limited longitudinal movement is thus afforded the welt presser 116 in order to permit an adjustment thereof relatively to the last and upper to be operated upon. The welt presser is urged forwardly and upwardly by a spring 140 (Fig. 4) attached to the welt presser and extending therefrom forwardly and upwardly and attached at its upper end to the machine frame. The forward movement of the welt presser 116 under the tension of the spring 140 is limited by a stop 142 in the form of a boss formed at the forward end of a slide 144 and arranged to extend downwardly through an opening 145 (Fig. 5) in the table 120. The slide 144 is arranged for longitudinal movement in a groove formed in the under surface of the welt presser. The stop 142 is clamped in adjusted position by a clamping screw 146 (Fig. 4) extending downwardly through a slot 148 formed in the welt presser and having threaded engagement within a tapped hole formed in the slide 144. The stop 142 abuts the rearward edges of the wiper plates 94 at a point directly back of the halved joint 118 and has its forward movement arrested by the engagement of the depending head of the rivet 124 with the forward extremity of the groove 122 formed in the table 120. The spring 140 thus operates through the stop 142 to hold the wiper plates 94 yieldingly at the forward limit of their movement and it also operates to urge the wipers forwardly into the welt crease when a last and upper are in operative position as best shown in Fig. 4. The welt presser 116 is actuated by a cam 149 (Fig. 2) secured to the main shaft 100 through a bell crank lever 150 pivoted to a bracket 152 by a cross shaft 154. The bracket 152 is secured at its upper end to the machine frame by screws 156 extending through ears 158 (Fig. 3) projecting outwardly from the bracket. At its lower end the bracket is secured to the table 120 by screws 160 extending upwardly through the table. The bracket 152 thus operates to support the forward end of the table 120 and to resist depression of the table by the welt presser 116. The bracket 152 (Fig. 3) has the general shape of an inverted U having the ends of its vertical members secured to the table 120 and having the cross shaft 154 mounted in its vertical members about midway of their height. The bell crank lever 150 is held against transverse movement relatively to the bracket 152 by the vertical members of the bracket and is yieldingly held in contact with the cam 149 by a spring 162 attached to the bell crank lever and extending upwardly therefrom and attached at its upper end to a pin 164 (Fig. 2) extending forwardly from the bracket 152. The cam 149 acts on a roll 166 (Fig. 4) pivoted to the end of one arm of the bell crank lever and another roll 168 is pivoted to the other arm of the bell crank lever for engagement with the welt presser 116.

The welt presser having been actuated to straighten the welt about the heel end of the upper, a hook 170 (Fig. 1) is automatically actuated by a compression spring 180 to pull the spindle 26 rearwardly of the machine, thereby forcing the wiper plates 94 farther into the welt crease and pressing the heel end of the upper against a back seam wiper 172. The hook 170 is pivoted at 174 to the machine column 20 and has its active surface 176 formed as a cam face and arranged to engage a roll 178 carried by the pin 29 on the spindle carrier 24. The means for actuating the hook 170 may be substantially the same as the mechanism for actuating a similar hook disclosed in Patent No. 1,602,618, hereinbefore referred to. Briefly described, said actuating means comprises a link 182 pivoted at its lower end to a rearward extension of the hook and pivoted at its upper end to a bell crank lever 184, which in turn is pivoted at 186 to the machine frame. The vertical arm of the bell crank lever 184 carries a cam roll 188 which engages a cam 190, (Fig. 2) said cam operating to time the actuation of the hook 170 by the compression spring 180.

The movement of the hook 170 is utilized to reset the clutch and limit the rotation of the main shaft 100 to a single revolution. The connections from the hook 170 for resetting the clutch are substantially the same as in Patent No. 1,602,618 above referred to and comprise a lever 192 (Fig. 1) arranged to be actuated by the hook 170 to impart a forward movement to the clutch rod 102 in order to release the plate 114 from the latch member 112 and permit the clutch rod to be lifted by the spring 194.

After the cam hook 170 has operated to actuate the jack spindle 26 the rise 171 of the cam 149 (Fig. 2) engages the roll 166 of the lever 150 whereby the cam again actuates the welt presser 116 to press the welt into its final shape. The welt presser 116 is now substantially horizontal and is free to move rearwardly with the last and upper during the rearward movement thereof incidental to the wiping of the back seam. It is also to be noted that the contacting surfaces of the wiper plates 94 and the table 120 are polished or otherwise treated to permit the wiper plates to slide upon the table after the final actuation of the welt presser.

During the final actuation of the welt presser 116 to press the welt into its final shape, the back seam wiper 172 (Fig. 2) which may be constructed and actuated substantially as disclosed in Patent No. 1,443,288, above referred to, is actuated to downwipe the back seam in order to remove therefrom any wrinkles which may have occurred therein. As illustrated, the wiper 172 is mounted in a T-way (not shown) in a vertical slide 196 (Fig. 4) and is secured against movement in the T-way by a screw 198 extending through the wiper and into the slide. The slide 196 is actuated by a cam 200 (Fig. 2) to impart a downward movement to the back seam wiper 172. The cam 200 is secured to the main shaft 100 and is arranged to actuate the slide 196 through an arm 202 pivoted on a stud 204 mounted in the machine frame, an arm 203 formed integrally with the arm 202 and offset therefrom (Fig. 3) to bring it into alinement with the slide 196, and a link 208 pivoted at one end to the lower end of the arm 203 and at its opposite end to the lower end of an arm 210 arranged to actuate the slide 196. At its upper end the arm 202 has a cam roll 206 pivoted thereto for engagement with the cam 200, said roll being held against its cam by a spring 220 one end of which is attached to the arm 202 and the other end of which is attached to the machine frame. The arm 210 is pivoted at its upper end to the machine frame and has formed in its forward surface a toothed segment 212 constructed and arranged for engagement with a rack 214 adjustably secured to the slide 196, and a slot 216 is provided in the slide 196 to provide the necessary clearance for the stud 218 upon which the arm 210 is pivoted. During the actuation of the back seam wiper 172 the spring 180 exerts a constant upward pull on the rearwardly extending arm of the hook 170 thereby advancing the spindle 26 during the downward movement of the back seam wiper and maintaining a constant and uniform pressure of the heel of the shoe against the forward face of the wiper.

As the back seam wiper comes to the limit of its downward stroke a tack driving mechanism, which may be substantially the same as that disclosed in Patent No. 1,356,510, above referred to, is actuated to drive a tack through the back of the upper and into the last at one side of the back seam. The tack is driven through a square cut notch provided in the upper edge of the back seam wiper and extended downwardly to the elevation of the tack nozzle 222 in order to provide clearance for the actuation of the tack driver and also to prevent the tack from being bent over by engagement with the wiper during the retraction of the welt presser 116 and the return of the shoe to the position illustrated in Fig. 2.

After the horizontal tack has been driven the welt and upper are tacked at the center of the rear end of the heel seat by a tack driver 98 of usual construction, and at opposite sides of the heel seat, by a pair of tack drivers 224 also of usual construction. The tack driver 98 and the tack drivers 224 are actuated in unison by an actuator arm 226. An adjustable abutment in the form of a split clamp 228 is mounted at the upper end of the guide 230 within which the tack driver 98 is arranged to slide. The abutment 228 determines the limit of the strokes of the tack drivers 98 and 224 and thus determines the extent to which the tacks project above the surface of the welt. Preferably the split clamp 228 is so adjusted that the tacks are driven through the welt, upper and insole and into the last bottom. Accordingly, it is desirable that the usual heel plate be omitted from the last. If it is desirable, as an aid to subsequent operations upon the shoe, that the last be provided with a heel plate, the split clamp 228 is preferably so adjusted that the tacks will be driven through the welt and upper and into the insole and will come to rest without having struck the heel plate.

The tack drivers 224 have each a ball and socket connection with the actuator arm 226, said connection comprising a ball 236 formed at the upper end of each of the tack drivers, and screws 232 mounted in the forward ends of the actuator arm (Fig. 3) and arranged to be secured in adjusted position by split clamps formed in the arm. The screws 232 are slightly concaved at their lower ends to provide a bearing for the balls 236, said balls being held in contact with the screws 232 by inverted caps 234 internally threaded for engagement with the screws 232, each of the caps 234 being provided at its lower end with a rounded flange which forms a seat for the ball 236. The cap 234 may be secured in adjusted position upon the screw 232 by a cotter pin 238 extending through open end slots provided at opposite sides of the cap 234 and through a hole provided in the screw 232. By releasing the clamping screws 239 which secure the screws 232 to the actuator arm 226 each of the screws 232 may be adjusted in order to impart to each of the tack drivers 224 an independent adjustment in the direction of its stroke.

In order that the tackers may automatically arrange themselves in predetermined positions whereby the tacks may be driven into the welt at points substantially adjacent to the seam connecting the welt to the upper without danger of driving them through the seam itself, connections are provided between the wiper plates 94 and the tackers whereby the tackers partake of the movement of the wiper plates as a last and upper are brought into engagement therewith. Accordingly, the guide 230 of the central heel seat tacker is rearwardly extended at its lower extremity and pivoted between a pair of lugs 240 (Fig. 2) projecting upwardly from the welt presser 116, and the stop 142 which engages the rearward edges of the wiper plates and determines the relative position of the wiper plates and the welt presser is provided with an adjustment lengthwise of the welt presser, as hereinbefore described. By adjusting the stop 142 the operative position of the welt presser may be adjusted lengthwise of the last and the central heel seat tacker will partake of that adjustment.

In the illustrated machine the arrangement of the side tackers relatively to the seam uniting the welt and upper is effected by connections from the wiper plates 94 whereby the spreading of the wiper plates as the heel end of a shoe is brought into engagement therewith causes the tackers to move away from each other and arrange themselves in predetermined relation to the welt regardless of the width of the heel to be operated upon. The connections between the tackers and the wiper plates comprise a pair of L-shaped members 242 (Fig. 3) pivoted to tack driver guides 244 near their lower extremities and having their horizontal arms extending outwardly and drilled longitudinally for the reception of a cross rod 246. A pair of slides 248 have tongue and groove connections with downwardly extending ears formed in the L-shaped members 242 (Fig. 2) and are adjustably secured to said ears by clamping screws 250 extending through slots provided in the slides. The slides 248 are yieldingly held against the outer edges of the wiper plates by the compression springs 126 and 128 mounted on the cross rod 246 and held between nuts 254 and the outer edges of the L-shaped members 242.

In order that the tackers may be moved downwardly in order to bring them into operative relation to the work prior to the driving of the tacks and in order that the tackers may be retracted after the tacking operation to permit the removal of the work without interference therefrom connections are provided between the tackers and the free end of the welt presser 116 whereby the tackers partake of the vertical movement of the welt presser. The connections between the central heel seat tacker 98 and the welt presser consist of the lugs 240 extending upwardly from the welt presser and the rearward extension of the sleeve 230 pivoted to said lugs, as hereinbefore described. The nozzle of the central heel seat tacker is positioned within a bell-mouthed opening 256 (Fig. 4) extending downwardly through the welt presser. The side tackers 224 are connected to the welt presser by extending the welt presser forwardly between the L-shaped members 242 and drilling the forward extremity of the presser for the reception of the cross rod 246.

Having described my invention, what I claim as new and desire to secure by Letters Patent of the United States is:

1. In a machine for operating on an end of a pre-welted upper, the combination of a support for a last, wipers having a fixed elevation and arranged in a plane substantially parallel to the plane of an end of the last bottom, welt pressing means, means for actuating the pressing means to bring the welt into engagement with the wipers, means for thereafter actuating the last support to bring the upper firmly into engagement with the wipers, and means for thereafter actuating the pressing means to apply further pressure to the welt.

2. In a machine for operating on an end of a pre-welted upper, the combination of a last support, wipers supported at a fixed elevation and arranged to engage the upper in the welt crease, a presser for pressing the welt against the wipers, and yielding means for resisting depression of the last support.

3. In a machine for operating on an end of a pre-welted upper, the combination of a last supporting spindle movable into and out of operative position, wipers supported at a fixed elevation and arranged to engage the upper in the welt crease, a welt presser arranged to press the welt against the wipers, a depressor for depressing the last and upper, as the spindle is moved into operative position, in order to position the welt between said presser and wipers.

4. In a machine for operating on an end of a pre-welted upper, the combination of a last supporting spindle movable into and out of operative position, a heel post arranged for movement longitudinally of the spindle, means for locking the heel post to the spindle, wipers arranged to engage the upper in the welt crease, a welt presser for pressing the welt against the wipers, a depressor for positioning the welt between the welt presser and the wipers as the spindle is moved into operative position, and yielding means for resisting depression of the spindle.

5. In a machine for assembling an upper upon its last preparatory to lasting, the combination of means for operating on the heel end of an upper, work supporting means comprising a spindle movable into and out of operative position, a heel post yieldingly supported on the spindle, a depressor arranged to be actuated by the movement of the spindle into operative position in order to depress the heel post to bring the upper into position to be operated upon, and means actuated by the movement of the spindle into operative position to lock the heel post thereto.

6. In a machine for assembling an upper upon its last preparatory to lasting, the combination of means for operating on the heel end of an upper, work supporting means comprising a spindle movable into and out of operative position, a heel post yieldingly supported on the spindle, a depressor arranged to be actuated by the movement of the spindle into operative position in order to depress the heel post to bring the upper into position to be operated upon, and a latch arranged to be actuated by the movement of the spindle into operative position to lock the heel post thereto.

7. In a machine for assembling a pre-welted upper upon its last preparatory to lasting, the combination of means for operating on the heel end of an upper including means for flattening the welt, work supporting means comprising a spindle movable into and out of operative position, a heel post yieldingly supported on the spindle, and yielding means for resisting depression of the spindle.

8. In a machine for assembling a pre-welted upper upon its last preparatory to lasting, the combination of means for conforming the welt at the heel end of the upper to a plane substantially parallel to the heel seat, a work support comprising a hollow spindle movable into and out of operative position, a heel post yieldingly supported therein, a depressor arranged to be operated by the movement of the spindle into operative position to depress the heel post in order to bring the upper into position to be operated upon, a latch arranged to be actuated by movement imparted to the spindle to arrest depression of the heel post, and a spring mounted on the spindle and arranged to resist depression thereof.

9. In a machine for assembling an upper upon its last preparatory to lasting, the combination of operating instrumentalities, a work support comprising a carrier mounted to swing on a fixed pivot, a spindle arranged for parallel movement relatively to said carrier, a heel post yieldingly supported on the spindle, and means arranged to be actuated by movement imparted to the spindle to lock the heel post thereto.

10. In a machine for assembling an upper upon its last preparatory to lasting, the combination of operating instrumentalities, a work support comprising a spindle and a heel post yieldingly supported thereby, means for varying the initial position of the heel post longitudinally of the spindle, and means actuated by movement imparted to the spindle to lock the heel post thereto.

11. In a machine for assembling an upper upon its last preparatory to lasting, the combination of operating instrumentalities, a work support comprising a spindle, and a heel post yieldingly supported thereby, means for varying the initial position of the heel post longitudinally of the spindle comprising a slide mounted on the spindle, a stop on the heel post arranged to engage the slide, a stop on the spindle arranged to arrest the slide, and means actuated by movement imparted to the spindle to lock the heel post thereto.

12. In a machine for assembling an upper upon its last preparatory to lasting, the combination of operating instrumentalities, a work support comprising a hollow spindle movable into and out of operative position and a heel post yieldingly supported therein and arranged for movement longitudinally thereof, means for varying the initial position of the heel post longitudinally of the spindle comprising a rotary sleeve mounted to slide on the spindle and provided, at its lower end, with a series of surfaces arranged at progressively varying positions longitudinally of the spindle, a stop on the heel post arranged to engage the lower end of the rotary sleeve, a stop on the spindle arranged to arrest the upward movement of the sleeve, and means actuated by movement imparted to the spindle to lock the heel post thereto.

13. In a machine for operating on the heel end of a pre-welted upper, the combination of a welt presser and a work support constructed and arranged for yieldingly urging the last bottom against said welt presser, said support comprising a carrier mounted to swing on a fixed pivot, a spindle arranged for movement lengthwise of said carrier, and a spindle supporting spring supported on said carrier.

14. In a machine for operating on the heel end of a pre-welted upper, the combination of a welt presser and a work support constructed and arranged for yieldingly urging the last bottom against said welt presser, said support comprising a carrier mounted to swing on a fixed pivot, a spindle, parallel motion links connecting the carrier and the spindle, and a spring arranged between the carrier and the spindle to support the spindle.

15. In a machine for operating upon the heel end of a pre-welted upper, the combination of means for clamping the welt and holding it against downward movement and power actuated means for downwiping the heel end of the upper.

16. In a machine for assembling a pre-welted upper upon its last preparatory to lasting, a clamp for bringing the welt into a plane substantially parallel to the adjacent portion of the last bottom and for thereafter pressing the welt out flat in order to give it its final shape.

17. In a machine for operating upon the heel end of a pre-welted upper, a clamp for the welt comprising a pair of wipers arranged to engage the upper in the welt crease, a clamping member arranged in opposition to said wipers, and power actuated means for applying pressure to the clamping member in order first to bring the welt into a plane substantially parallel to the heel seat and thereafter to press it against the wipers in order to give it its final shape.

18. In a machine for operating upon the heel end of a pre-welted upper, the combination of a clamp for the welt comprising a pair of wipers yieldingly urged toward each other for engagement with the upper in the welt crease, a clamping member arranged in opposition to said wipers, and power actuated means for actuating said clamp first to bring the welt into a plane parallel to the heel seat and thereafter to press it into its final shape 19. In a machine for operating upon the heel end of a pre-welted upper, the combination of a clamp for the welt comprising a pair of wipers arranged for engagement with the upper in the welt crease, a support for said wipers, a clamping member arranged in opposition to said wipers, and power actuated means for imparting relative movement to said clamping elements in order to bring the welt into a plane substantially parallel to the heel seat, and means for thereafter imparting a further relative movement to said clamping elements to press the welt into its final shape.

20. In a machine for assembling a pre-welted upper upon its last preparatory to lasting, means for operating upon the welt at the heel end of the upper comprising a pair of wipers arranged to be pressed into engagement with the upper in the welt crease, a fixed support for the wipers, a presser arranged in opposition to said wipers, means for actuating said presser to bring the welt into a plane parallel to the heel seat, and means for thereafter further actuating said presser to press the welt into its final shape.

21. In a machine for assembling a pre-welted upper upon its last preparatory to lasting, power actuated means for operating upon the welt at the heel end of the upper comprising a pair of wipers arranged to be pressed into engagement with the upper in the welt crease, a vertically fixed support for the wipers, a presser arranged in opposition to said wipers, means for actuating said presser to bend the welt outwardly from the upper, and means for further actuating said presser to press the welt into its final shape.

22. In a machine for assembling shoe parts upon their lasts preparatory to lasting, the combination of a support for a last, a wiper for downwiping the heel end of the upper, and a clamp for holding the upper as it is wiped which clamp is arranged to permit a rearward movement of the last and upper toward the wiper during the downwiping operation.

23. In a machine for assembling a pre-welted upper upon its last preparatory to lasting, a support for a last, a wiper for downwiping the heel end of the upper, and a clamp for securing the welt in predetermined relation to the last, said clamp being arranged to permit rearward movement of the last and upper after the clamping of the welt.

24. In a machine for operating on the heel end of a pre-welted upper, a pair of wipers constructed and arranged to engage within the welt crease, a fixed support for the wipers, a presser arranged in opposition to said wipers, means for actuating said presser to bring the welt into parallel relation to the heel seat, and means for relative movement of the upper and the wipers heightwise and lengthwise of the last in order to bring the wipers into engagement with the upper in the welt crease and to overwipe the heel end of the upper margin.

25. In a machine for assembling a pre-welted upper upon its last preparatory to lasting, means for operating on the welt at the heel end of the upper comprising a pair of wipers, a vertically fixed support for the wipers, a presser arranged in opposition to said wipers, means for actuating said presser to bring it into a plane parallel to the heel seat, means for relative movement of the last and the wipers in order to bring the wipers into engagement with the upper in the welt crease, and means for thereafter further actuating said presser to press the welt into its final shape.

26. In a machine for assembling a pre-welted upper upon its last preparatory to lasting, means for operating upon the welt at the heel end of the upper comprising a pair of wipers, a fixed support for the wipers, a presser arranged in opposition to said wipers, means for actuating said presser to bring the welt into a plane parallel to the heel seat, means for moving the upper and last toward the wipers to press the wipers into engagement with the upper in the welt crease, and means for thereafter further actuating said presser to press the welt into its final shape.

27. In a machine for assembling a pre-welted upper upon its last preparatory to lasting, a power actuated clamp arranged to engage the welt and bring it into a plane parallel to the adjacent portion of the last bottom.

28. In a machine for operating upon the heel end of a pre-welted upper, a power actuated clamp arranged to engage the welt at the heel end of the upper and bring it into a plane parallel to the heel seat.

29. In a machine for operating on the heel end of a pre-welted upper, the combination of means for holding the welt in a predetermined position, and means for downwiping the heel end of the upper while the welt is so held.

30. In a machine for operating on the heel end of a pre-welted upper, the combination of a pair of end embracing wipers arranged for engagement with the upper in the welt crease, means for inserting fastenings through the welt and upper and into the shoe bottom at opposite sides of the heel seat, and means actuated by the wipers for determining the locations of said fastenings widthwise of the heel seat.

31. In a machine for operating on the heel end of a pre-welted upper, the combination of means arranged for engagement with the upper in the welt crease comprising a pair of wipers yieldingly brought toward each other to predetermined limits and arranged to be spread apart by the engagement of the heel end of a last and upper therebetween, means for inserting fastenings through the welt and upper and into the shoe bottom at opposite sides of the heel seat, and means actuated by the wipers for determining the locations of said fastenings widthwise of the heel seat.

32. In a machine for operating upon the heel end of a pre-welted upper, the combination of a pair of wipers arranged to embrace the heel end of the upper, a pair of fastening inserting elements arranged to insert fastenings through the welt, upper and insole at opposite sides of the heel seat, a pair of slides arranged for movement to urge the fastening elements toward each other, and arranged for engagement with said wipers whereby the operative positions of the fastening inserting elements are determined by the degree of separation of the wipers effected by the insertion of the heel end of the upper therebetween.

33. In a machine for operating upon the heel end of a pre-welted upper, the combination of wipers for overwiping the heel end of the upper, a plurality of tackers for driving tacks through the welt and upper at opposite sides of the heel end of the upper, a central heel seat tacker for driving a tack through the welt and upper, an actuator for said tackers, and an adjustable abutment for arresting the actuator.

34. In a machine for operating on the heel end of a pre-welted upper, the combination of a central heel seat tacker for inserting a tack through the welt and upper and into the shoe bottom, tackers for inserting tacks through the welt and upper and into the shoe bottom at opposite sides of the heel seat, and means for effecting relative adjustment of the strokes of the tackers.

35. In a machine for operating on the heel end of a pre-welted upper, the combination of a central heel seat tacker for inserting a tack through the welt and upper and into the shoe bottom, a pair of tackers for inserting tacks through the welt and upper and into the shoe bottom at opposite sides of the heel seat, an adjustable abutment for arresting the central heel seat tacker in order to measure the strokes of all three tackers, and means for independent adjustment of the side tackers in the direction of their strokes.

36. In a machine for operating on the heel end of a pre-welted upper, the combination of a wiper for wiping the heel end of the upper toward its top, means for urging the upper rearwardly in order to maintain contact between the upper and the wiper, a clamp arranged to engage the welt and hold it against downward movement during the downwiping operation, said clamp being constructed and arranged to move rearwardly with the upper during the downwiping operation.

37. In a machine for operating on the heel end of a pre-welted upper, the combination of a wiper for wiping the heel end of the upper toward its top, means for urging the upper rearwardly in order to maintain contact between the upper and the wiper, and a clamp for clamping the welt at the heel end of the upper comprising wipers arranged to engage the upper in the welt crease and a presser arranged in opposition to said wipers, said clamping elements being arranged to move rearwardly with the upper after the welt has been clamped.

38. In a machine for operating on the heel end of a pre-welted upper, the combination of a wiper for wiping the heel end of the upper toward its top, means for urging the upper rearwardly in order to maintain contact between the upper and the wiper, a clamp for clamping the welt at the heel end of the upper comprising wipers held against vertical movement, and a presser arranged for vertical movement toward and from the wipers, said clamping elements being arranged to move rearwardly with the upper after the welt has been clamped.

39. In a machine for operating on the heel end of a pre-welted upper, the combination of a wiper for wiping the heel end of the upper toward its top, means for urging the upper rearwardly in order to maintain contact between the upper and the wiper, a clamp for clamping the welt at the heel end of the upper comprising wipers constructed and arranged to engage the upper in the welt crease, a support upon which the wipers are arranged for movement lengthwise thereof, a presser arranged in opposition to said wipers, yielding means for urging the presser forwardly of the upper, and connections between the presser and the wipers whereby the wipers are urged forwardly of the upper.

40. In a machine for operating on the heel end of a pre-welted upper mounted upon a last, the combination of a clamp for the welt comprising wipers constructed and arranged to engage the upper in the welt crease, a support upon which the wipers are arranged for movement lengthwise of the last, means for guiding the wipers in their lengthwise movement, and a welt presser arranged to press the welt against said wipers.

41. In a machine for operating on the heel end of a pre-welted upper mounted upon a last, the combination of a clamp for the welt comprising wipers constructed and arranged to engage the upper in the welt crease, a support upon which the wipers are arranged for movement lengthwise of the last, a pin and groove connection between the wipers and the support whereby the wipers are guided in their movement lengthwise of the last, and a welt presser arranged to press the welt against said wipers.

42. In a machine for operating on the heel end of a pre-welted upper mounted upon a last, the combination of a clamp for the welt comprising wipers constructed and arranged to engage the upper in the welt crease, a support upon which the wipers are arranged for movement lengthwise of the last, means for guiding the wipers in their lengthwise movement in order to maintain the active surfaces of the wipers in position to embrace the heel end of the last and upper as they are brought into position to be operated upon, and a welt presser arranged to press the welt against the wipers.

43. In a machine for assembling a pre-welted upper upon its last preparatory to lasting, wipers constructed and arranged to engage the upper in the welt crease, said wipers being movable lengthwise of the last, tackers for driving tacks through the welt and upper and into the shoe bottom, and connections between the wipers and the tackers whereby the tackers move lengthwise of the last with the wipers.

44. In a machine for assembling a pre-welted upper upon its last preparatory to lasting, wipers constructed and arranged to engage the upper in the welt crease, tackers for driving tacks through the welt and upper and into the shoe bottom, and means for varying the relative position of the tackers and the wipers lengthwise of the last.

45. In a machine for assembling a pre-welted upper upon its last preparatory to lasting, wipers constructed and arranged to engage the upper in the welt crease, tackers for driving tacks through the welt and upper and into the shoe bottom, and connections between the wipers and the tackers for varying the position of the tackers relatively to the wipers both lengthwise and widthwise of the last.

46. In a machine for assembling a pre-welted upper upon its last preparatory to lasting, wipers constructed and arranged to engage the upper in the welt crease, tackers for driving tacks through the welt and upper and into the shoe bottom, a welt presser arranged for movement lengthwise of the last and yieldingly urged forwardly of the last, and connections between the presser and the tackers for urging the tackers forwardly of the last.

47. In a machine for assembling a pre-welted upper upon its last preparatory to lasting, tackers for driving tacks through the welt and upper and into the shoe bottom at opposite sides thereof, wipers constructed and arranged for engagement with the upper in the welt crease, said wipers being movable widthwise of the last in order to vary the positions of the tackers widthwise of the last, a welt presser arranged for movement lengthwise of the last, a stop extending from the presser into position to engage the wipers and arranged for adjustment lengthwise of the presser, and connections between the presser and the tackers for effecting movement of the tackers lengthwise of the last with the presser.

48. In a machine for assembling a pre-welted upper upon its last preparatory to lasting, tackers for driving tacks through the welt and the upper and into the shoe bottom, a welt presser arranged for movement in a direction substantially perpendicular to the heel seat, and connections between the welt presser and said tackers whereby said movement of the welt presser is imparted to the tackers.

49. In a machine for assembling a pre-welted upper upon its last preparatory to lasting, tackers for driving tacks through the welt and the upper and into the shoe bottom, a welt presser arranged for movement in a direction substantially perpendicular to the heel seat, and connections between the welt presser and said tackers whereby the tackers are brought into operative relation to the work in advance of their actuation and retracted after the tacks have been driven.

50. In a machine for assembling a pre-welted upper upon its last preparatory to lasting, wipers constructed and arranged for engagement with the upper in the welt crease, tackers for driving tacks through the welt and upper and into the shoe bottom at opposite sides thereof, connections between the wipers and the tackers for automatically adjusting the tackers widthwise of the last, a welt presser arranged for movement in a direction substantially perpendicular to the heel seat, and connections between the welt presser and said tackers whereby the tackers are brought into operative relation to the work in advance of their actuation and retracted after the tacks have been driven.

51. In a machine for operating upon the end of a pre-welted upper, the combination with a tack driving assembly including a plurality of tack drivers and a plurality of tack driver guides, of a welt presser constructed and arranged to carry said guides.

52. In a machine for operating upon the heel end of an upper, the combination with a tack driving assembly including a plurality of tack drivers and a plurality of tack driver guides, of a shoe bottom engaging member constructed and arranged to carry said guides, and an adjustable abutment mounted on one of said guides for arresting the tack drivers.

53. In a machine for operating upon the end of a pre-welted upper, the combination with a tack driving assembly including a plurality of tack drivers and a plurality of tack driver guides, of a welt presser constructed and arranged to carry said guides, and an adjustable abutment mounted on one of said guides for arresting the tack drivers.

NORWOOD H. KNOWLTON.